US006269808B1

United States Patent
Murahashi

(10) Patent No.: US 6,269,808 B1
(45) Date of Patent: Aug. 7, 2001

(54) LIQUID HEATING COOKER

(75) Inventor: Hidemine Murahashi, Nagoya (JP)

(73) Assignee: Paloma Industries, Limited, Aichi (JP)

( * ) Notice: Subject to any disclaimer, the term of this patent is extended or adjusted under 35 U.S.C. 154(b) by 0 days.

(21) Appl. No.: 09/613,499

(22) Filed: Jul. 10, 2000

(30) Foreign Application Priority Data

Sep. 14, 1999 (JP) ................................................. 11-260924

(51) Int. Cl.[7] .................................................... F24H 1/10
(52) U.S. Cl. .................................. 126/391.1; 126/351.1; 99/331; 99/403
(58) Field of Search ............................. 126/391.1, 351.1, 126/350.1; 431/1, 6, 20, 30, 31, 29; 99/331, 403, 330

(56) References Cited

U.S. PATENT DOCUMENTS 4,628,903 * 12/1986 Farnsworth ........................... 126/391
5,220,864 * 6/1993 Ejiri et al. ............................. 126/391
5,379,683 * 1/1995 Ejiri et al. ............................. 126/391
5,386,815 * 2/1995 Ejiri et al. ............................. 126/391

FOREIGN PATENT DOCUMENTS 2581722    7/1998  (JP) .

* cited by examiner

Primary Examiner—James C. Yeung
(74) Attorney, Agent, or Firm—Pearson & Pearson, LLP

(57) ABSTRACT

The period of pre-purging is selectively determined for improving the utility.

When a main run switch is turned on, it is examined at S1 whether or not the temperature of the oil in a frypot measured with a thermal sensor is not higher than a first setting level. If the oil temperature is not higher than the first setting level, it is examined at S2 whether the post-combustion time exceeds 10 minutes or not. When the post-combustion time exceeds 10 minutes, the pre-purging is carried out at S3 for 80 seconds. When not, the pre-purging is performed at S4 for 5 seconds. Then, the combustion is commenced at S5.

2 Claims, 7 Drawing Sheets

LIQUID HEATING COOKER

BACKGROUND OF THE INVENTION

TECHNICAL FIELD RELATED TO THE INVENTION

The present invention relates to a liquid heating cooker (such as a deep fat fryer or a noodle boiler) equipped with a burner as a heat source for mainly industrial use.

PRIOR ART

Industrial fryers and noodle boilers have been used for cooking foods (fried or boiled stuffs) each having a burner as a heat source. The burner is provided for heating a cooking liquid to be prepared in a vat or frypot using heat supplied from a combustion chamber or a heat exchanger via an exhaust passage. Before initiating or restarting the burner, a pre-purging process is required for exhausting from the combustion chamber and exhaust passage. For example, when a fryer is equipped with a pulse burner which repeats a cycle of combustion of a mixture of gas and air in its combustion chamber and its non-operating period before the ignition is extended, a small amount of the gas leaked out from an electromagnetic valve provided for supply of the gas may be accumulated. As the exhaust system is considerably large in size, care should be taken for avoiding no accidental combustion of the accumulated gas. For the purpose, a pre-purging process is commonly carried out for about 80 seconds. When the non-operating period from the stop to the restarting is relatively short, the pre-purging process may be as quick as substantially 5 seconds.

However, before oil in a frypot of the fryer is cleaned by filtering, the main run switch has to be turned off to avoid burning without the oil. After the filtering, the switch is turned on to restart the operation. This is followed by pre-purging for 80 seconds even if the duration of the filtering is short and thus delaying the operation. The applicant of the present invention presented an invention of a system including a combustion interrupting switch for temporarily stopping the combustion in the pulse burner with the main run switch being turned on so as to shorten the pre-purging process after the filtering and allow quick start of the operation, as disclosed in Japanese Utility Model No.2581722.

PROBLEMS THAT THE INVENTION IS TO SOLVE

The installation of such a combustion interrupting switch raises the overall production cost and the separately installed combustion interrupting switch itself is troublesome to be operated. Also, if the on/off operation of the combustion interrupting switch is not performed properly, the combustion may accidentally start during the filtering or may not be started after the filtering.

With the combustion interrupting switch, when the power supply for the fryer is interrupted e.g. by blackout, even the duration of the blackout is short, the pre-purging for the long period will be carried out after the power supply is recovered, hence impairing the utility of the fryer.

As defined in claims 1 and 2, the present invention is directed towards a liquid heating cooker which can select a desired length of the pre-purging with no use of the combustion interrupting switch, thus lowering the production cost and improving the operability. Means for solving the Problems For achievement of the object of the present invention, as defined in claim 1, the period of pre-purging is varied corresponding to the time elapsing from the previous cancellation of the combustion.

Also, for achievement of the object of the present invention, as defined in claim 2, the period of pre-purging is varied corresponding to the drop down of the temperature of a cooking liquid.

BEST MODES FOR EMBODYING THE INVENTION

The present invention will be described in the form of Embodiment 1 as the first invention and Embodiment 2 as the second invention, referring to the relevant drawings.
Embodiment 1

Figure 1:
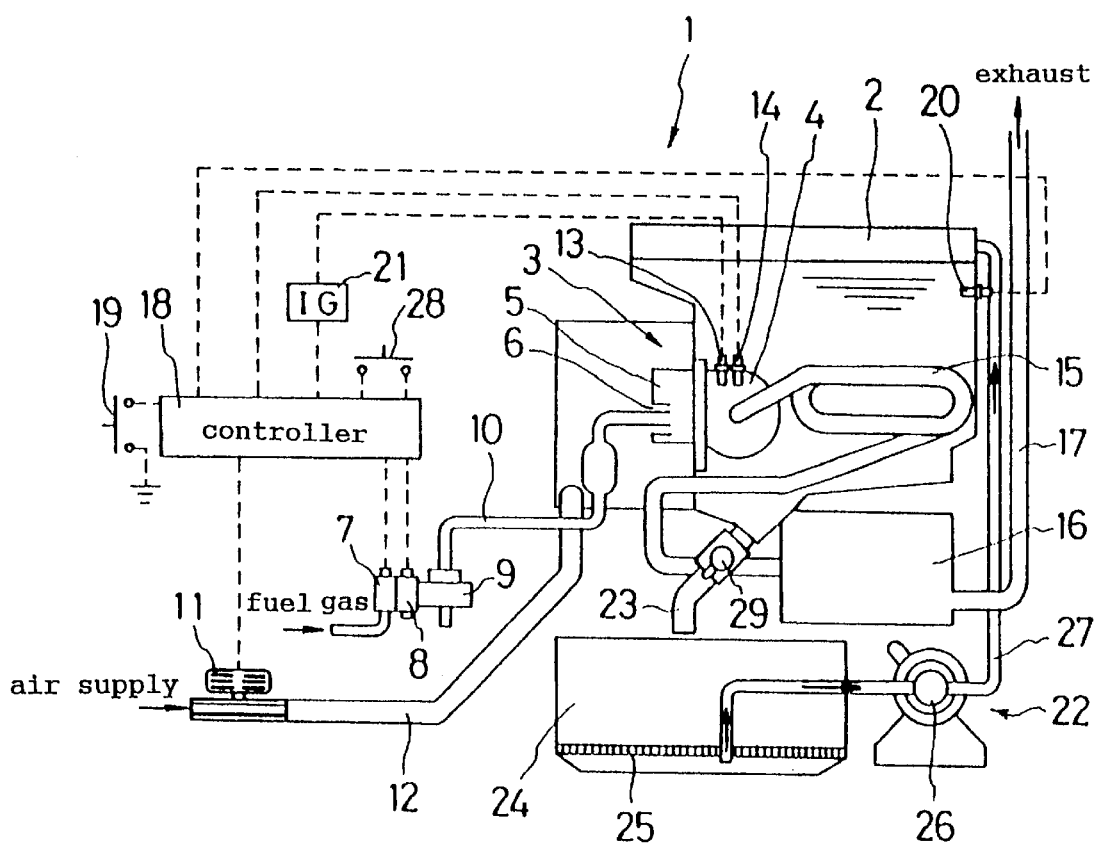
FIG. 1 is a schematic view of a fryer.

FIG. 1 is an overall explanatory view of an industrial deep fat fryer 1 (referred to as a fryer hereinafter) representing the liquid heating cooker. The fryer 1 comprises a frypot 2 which is filled with a cooking oil (referred to as an oil hereinafter) used as a liquid material for frying frozen foods, a pulse burner 3 provided as a combustion burner for repeating combustion (pulse combustion) to heat the oil in the frypot 2, a controller 18 for controlling mainly the combustion in the pulse burner 3, and an oil cleaner 22 for filtering the oil in the frypot 2.

The pulse burner 3 includes a combustion chamber 4 located within the frypot 2 and a mixing chamber 5 communicated to the combustion chamber 4 outside the frypot 2. The mixing chamber 5 has an opening 6 therein connected to a gas conduit 10 equipped with, from upstream, a source electromagnetic valve 7, a main electromagnetic valve 8, and a gas governor 9 for supply of a fuel gas. The mixing chamber 5 is also connected to an air supply conduit 12 equipped with a blower 11 for supply of air for the combustion. There are provided an ignition plug 13 located in the combustion chamber 4 and a flame rod 14 for detecting the flame.

The combustion chamber 4 is connected to a tail pipe 15 located in the frypot 2. The tail pipe 15 is connected by a de-coupler 16 in the frypot 2 to an exhaust conduit 17 which extends to the outside of the fryer for exhaustion.

The controller 18, when a main run switch 19 is turned on, controls the opening and closing actions of the source electromagnetic valve 7 and the main electromagnetic valve 8, the action of an igniter 21 for generating a spark on the ignition plug 13, and the driving action of the blower 11 in response to a signal from a thermal sensor 20 for switching between the combustion and the stop of the pulse burner 3 to maintain the temperature of the oil within a desired range, as will be described later in more detail.

The oil cleaner 22 comprises an oil tank 24 located beneath an oil drain conduit 23 connected to the bottom of the frypot 2, an oil filter 25 mounted as a flat netting across the oil tank 24 slightly above the bottom, an oil pump 26 for pumping up the oil passed through the oil filter 25 and returning it to the frypot 2, and an oil conduit 27 for forming a circuit of the circulation. When a filtering switch 28 is turned on, an oil drain valve 29 mounted across the oil drain conduit 23 opens to convey the oil to the oil tank 24. As the oil pump 26 is driven for filtering, the oil is passed through the oil filter 25 and returned back to the frypot 2.

Figure 2:
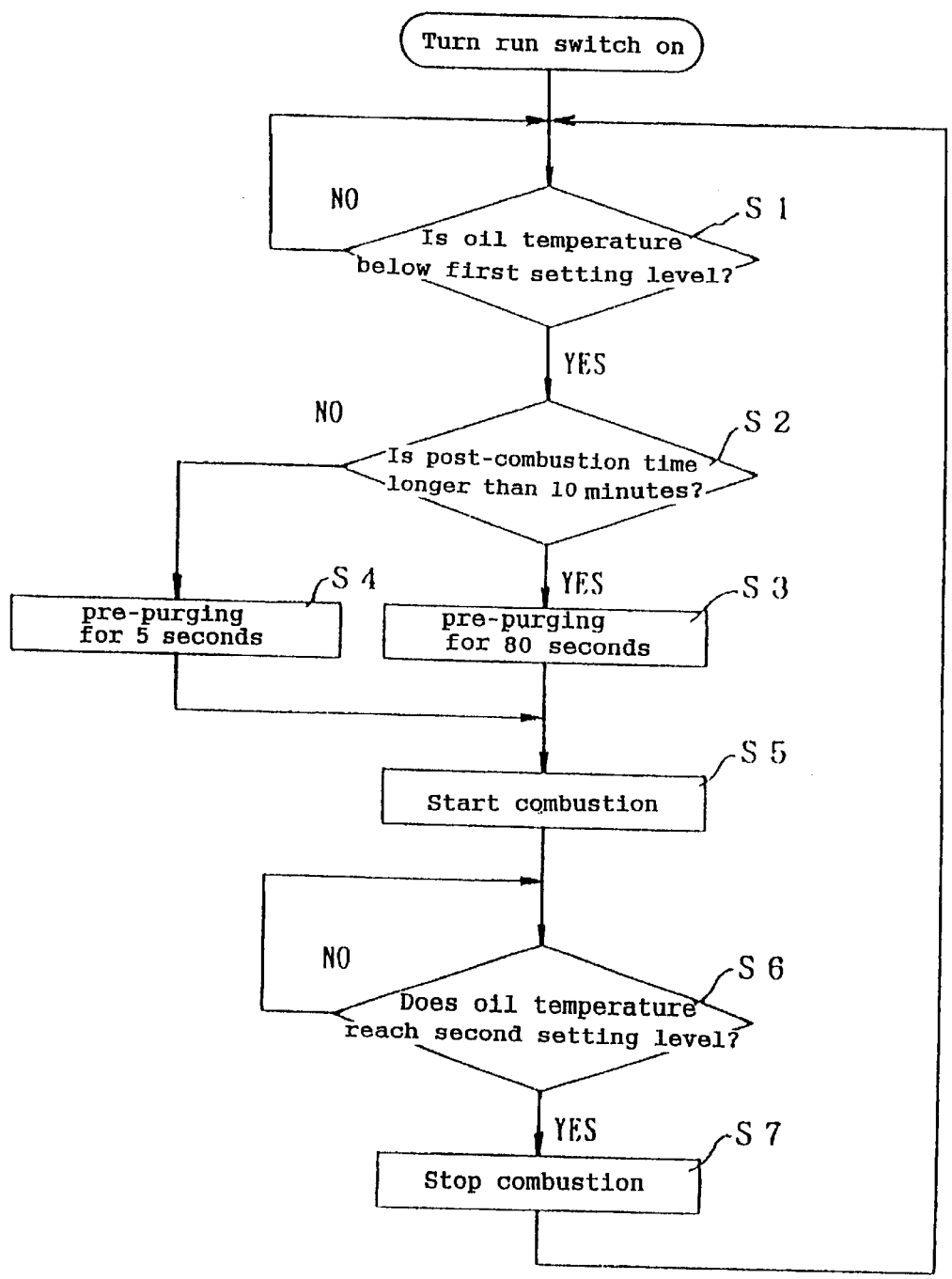
FIG. 2 is a flowchart showing a procedure of controlling the combustion in the fryer according to Embodiment 1.

A procedure for operating the fryer 1 is now explained referring to the flowchart of FIG. 2. When the main run switch 19 is turned on, it is examined at Step S1 from a measurement of the thermal sensor 20 whether the temperature of the oil in the frypot 2 is below a first setting level (for example, 180° C.). When the oil temperature is below the level, it is then examined at S2 whether the time after the previous stop of the combustion (referred to as a post-combustion time hereinafter) elapses 10 minutes or not. In the filtering mode, while the main run switch 19 is turned off for avoiding the combustion without the oil, the post-combustion time is counted up. When it is judged at S2 that the post-combustion time exceeds 10 minutes, the pre-purging for 80 seconds as a first pre-purging is carried out at S3. If not exceeding 10 minutes, the pre-purging is carried out at S4 for 5 seconds as a second pre-purging. The pre-purging is an action for driving the blower 11 to supply the air and thus discharge the remaining gas from the combustion discharge system consisted of the mixing chamber 4, the combustion chamber 4, the tail pipe 15 as a passage of the exhaust gas from the combustion chamber 4, the de-coupler 16 at the downstream of the tail pipe 15, and the exhaust conduit 17. During the pre-purging, the action of the pulse burner 3 is not initiated. It is noted that the pre-purging continues 80 seconds when the post-combustion time exceeds 10 minutes because the leakage of fuel gas from the source electromagnetic valve 7 and the main electromagnetic valve 8 may be increased over 10 minutes even though the amount of the leakage is very small; as the exhaust system is large in the volume, care should be taken for avoiding any accidental combustion. If the post-combustion time is 10 minutes or less, the leakage is small enough to be removed by the pre-purging of 5 seconds.

After the pre-purging corresponding to the post-combustion time is completed, the pulse burner 3 starts its action for combustion at S5. First, the fuel gas is introduced through the source electromagnetic valve 7 and the main electromagnetic valve 8 both being opened, adjusted to a desired pressure by the gas governor 9, and fed via the gas conduit 10 to the mixing chamber 5. In the mixing chamber 5, the fuel gas is mixed with air supplied via the air supply conduit 12 by the blower 11 and a resultant mixture gas is transferred into the combustion chamber 4. In the combustion chamber 4, the mixture gas is ignited by sparking of the ignition plug 13 triggered with the igniter 21. As the combustion of the mixture gas starts and it is detected by the flame rod 14, the operation is allowed to continue. Accordingly, the oil in the frypot 2 is heated by the walls of the combustion chamber 4 and the tail pipe 15 and when it is judged at S6 that the temperature of the oil in the frypot 2 detected with the thermal sensor 20 reaches a second setting level (for example, 182° C.), the combustion of the pulse burner 3 is stopped at S7.

As another period of time has elapsed and it is judged at S1 that the temperature of the oil is declined to below the first setting level, the pre-purging is performed for a selected period corresponding to the post-combustion time examined at S2. Since the actions from S3 to S7 for controlling (the on and off actions of) the combustion are repeated, the temperature of the oil in the frypot 2 can be maintained within a range from 180° C. to 182° C.

Regardless of the on and off actions of the main run switch 19, the pre-purging is conducted corresponding to the previous post-combustion time. The period of the pre-purging after the filtering can thus be determined from the filtering time or the post-combustion time. In common, the filtering is completed in five minutes and thus followed by the pre-purging of 5 seconds; the filtering does not involve any delay in the cooking caused by 80 seconds of the pre-purging, hence allowing the system to return back quickly to the continuous operation and improve its utility. Also, it is unnecessary to use the combustion interrupting switch for temporarily stopping the combustion with the main run switch 19 remaining switched on. Accordingly, the system will be lowered in the production cost and enhanced in the operability without extra manipulation.

Figure 3:
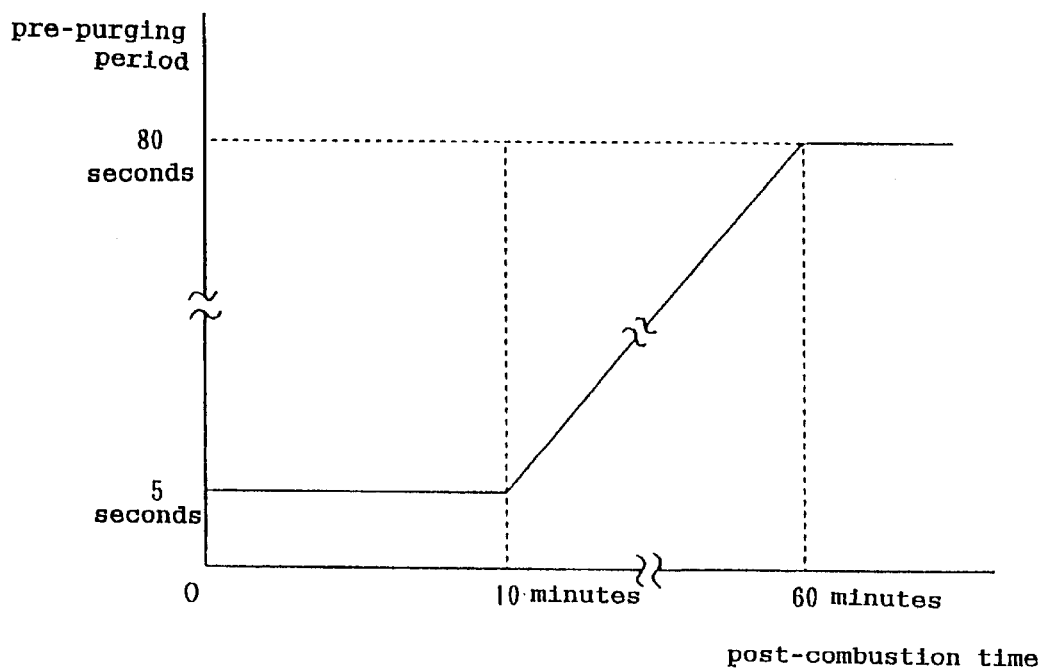
FIG. 3 is a graph diagram showing the relationship between the post-combustion time and the period of pre-purging.
Figure 4:
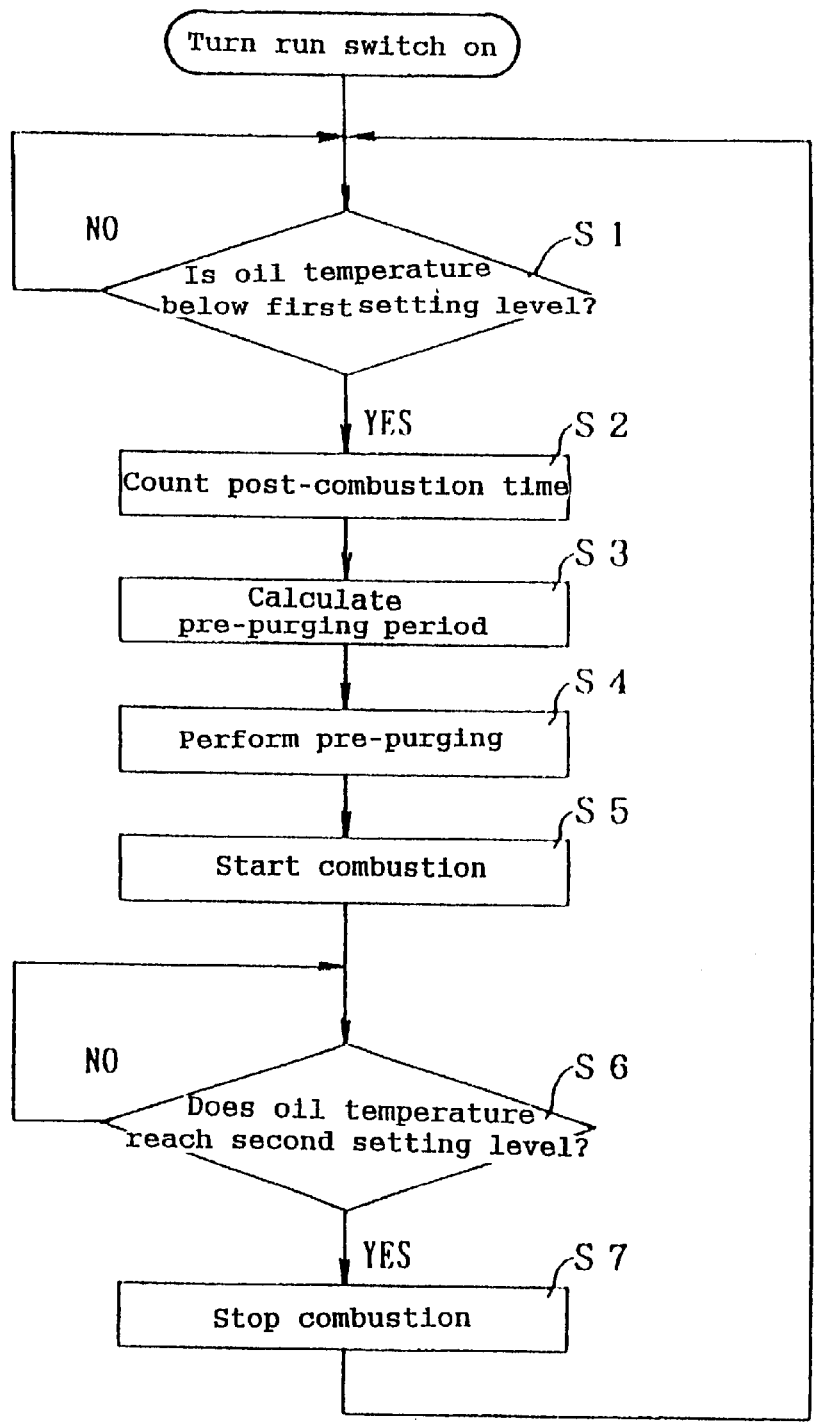
FIG. 4 is a flowchart showing a procedure in a modification of Embodiment 1.

Although the pre-purging in the above embodiment is selectively performed corresponding to the post-combustion time of a given length, its period may be selected from a more number of settings corresponding to the post-combustion time. For example, it is assumed that the period of the pre-purging is 5 seconds when the post-combustion time is 10 minutes or less, 80 seconds when one hour or more, and between the two timings, the period is determined by a numerical expression which linearly increases as the post-combustion time increases, as shown in FIG. 3. When it is judged at S1 in FIG. 4 that the temperature of the oil is below the first setting, the post-combustion time is counted at S2 and the period of the pre-purging is calculated at S3 from the post-combustion time using the numerical expression. This is followed by S4 where the pre-purging is carried out for a calculated period. The combustion of the pulse burner 3 is then commenced at S5. Then, the action of stopping the combustion (S6 and S7) upon the temperature rising to the second setting level is identical to that of FIG. 2. When it is judged at S1 that the temperature of the oil drops down to the first setting level, the period of the pre-purging is calculated corresponding to the post-combustion time.

In this modification, even when the post-combustion time exceeds 10 minutes, the pre-purging is not systematically carried out for 80 seconds but its period changes linearly based on the time, one hour, when the leakage of the fuel gas is replaced by an exhaust of the combustion. Accordingly, the pre-purging is carried for adequate period not for an unnecessarily long period thus enabling the system to return to the continuous operation at optimum timing and enhance its utility.

Embodiment 2

Figure 5:
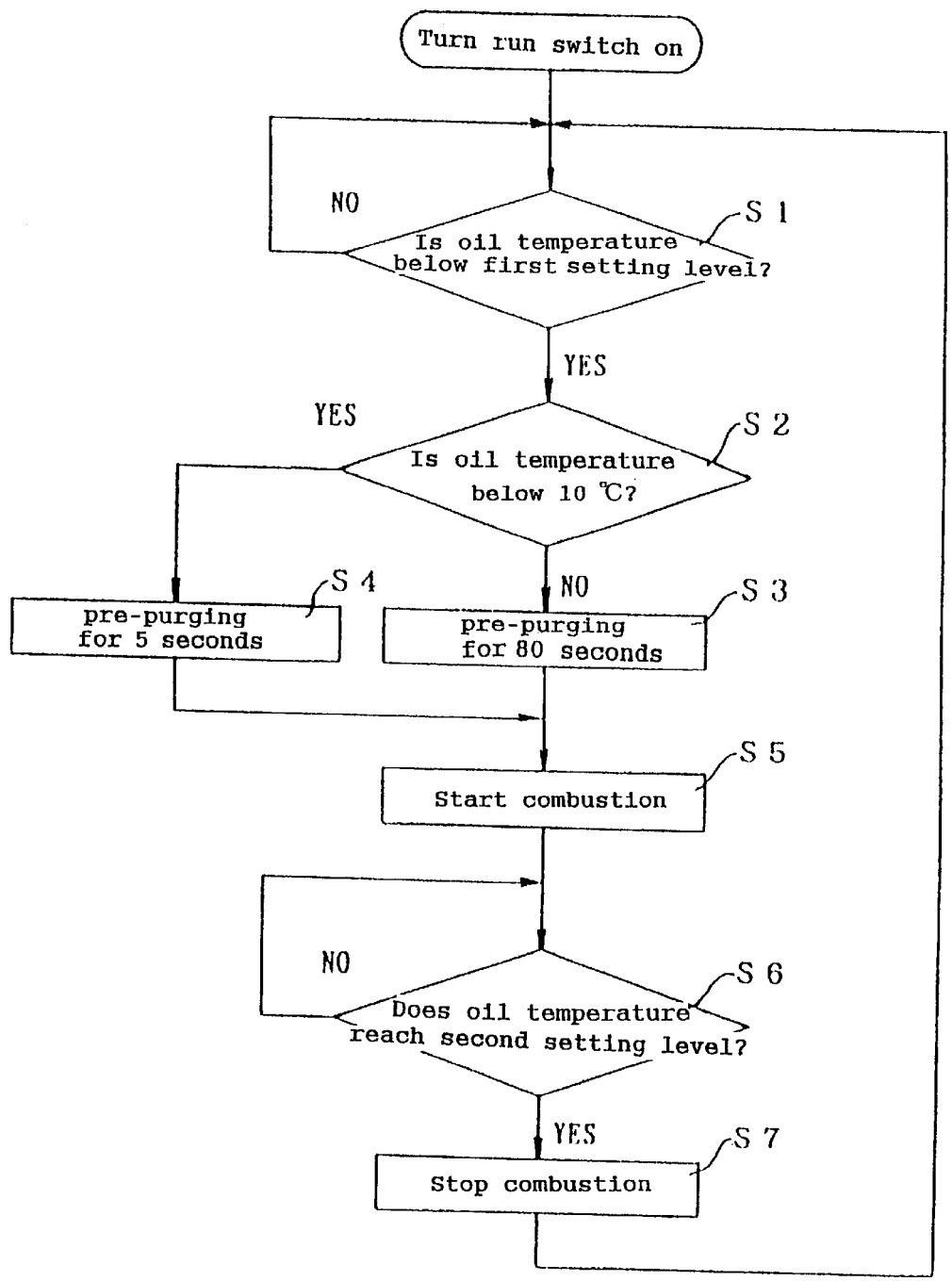
FIG. 5 is a flowchart showing a procedure of controlling the combustion in the fryer according to Embodiment 2.

Another embodiment of the present invention will now be described where the pre-purging is carried out not corresponding to the post-combustion time. The construction of a fryer 1 is identical to that of Embodiment 1, except that the action of the controller 18 is different. As the explanation of the like is not repeated, the procedure of Embodiment 2 is described referring to the flowchart of FIG. 5.

After it is judged at S1 that the temperature of the oil in the frypot 2 measured by the thermal sensor 20 drops down to the first setting level, it is then examined at S2 whether or not the temperature is decreased by a predetermined degree (for example, 10° C.) or smaller. More specifically, when the drop down of the temperature of the oil is not below 10° C., the pre-purging is carried out at S3 for 80 seconds. When the temperature drop is below 10° C., the pre-purging is performed at S4 for 5 seconds. Then, the combustion control following S5 is carried out.

Embodiment 2 allows the period of the pre-purging to be selectively determined by checking the temperature of the oil not by the on/off action of the main run switch 19. The period of the pre-purging after the filtering is thus be determined regardless of the time required for the filtering. Accordingly, any delay in the cooking caused by the pre-purging of 80 seconds after the filtering will be avoided. Instead, the pre-purging is carried out only for 5 seconds when the temperature drop of the oil is not large, hence permitting the system to readily return to the continuous operation and enhance its utility. Also, as the combustion interrupting switch is not needed, the production cost will be lowered and no extra manipulation will be required thus ensuring the same effect as of Embodiment 1 that the operability of the system is improved. Particularly in this embodiment, even if the action of the fryer 1 is stopped by fault such as blackout, the pre-purging after restarting may take a short period of time depending on the temperature of the oil. This allows the system to return back to the continuous operation after a short downtime due to blackout. Accordingly, this embodiment will be higher in the operational reliability than Embodiment 1 where the post-combustion time may be erased and reset by the blackout.

Figure 6:
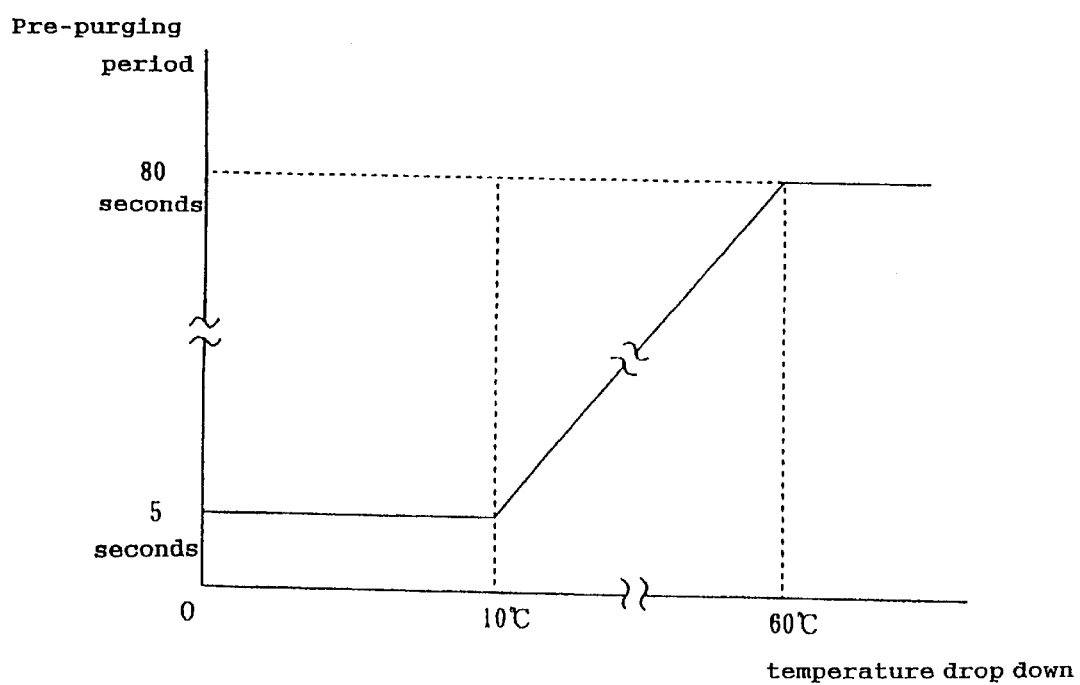
FIG. 6 is a graph diagram showing the relationship between the drop down of oil temperature and the period of pre-purging.
Figure 7:
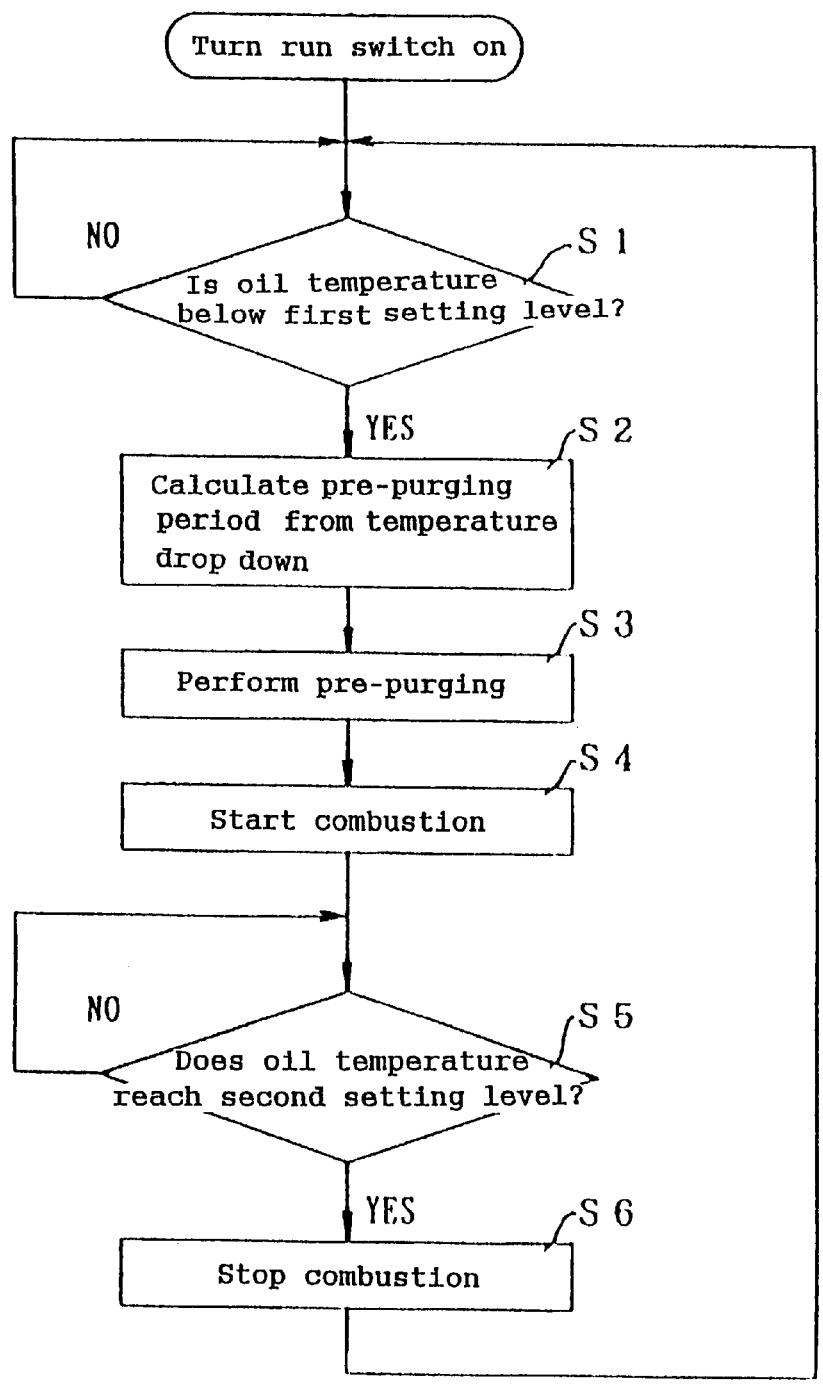
FIG. 7 is a flowchart showing a procedure in a modification of Embodiment 2.

In Embodiment 2, modifications like those of Embodiment 1 can be possible. For example, it is assumed that the period of the pre-purging is 5 seconds when the drop down of the oil temperature is 10° C. or smaller, 80 seconds when the temperature drop is 60° C. or higher, and between the two levels, the period is determined by a numerical expression which linearly changes as the decrease of the oil temperature becomes greater, as shown in FIG. 6. When it is judged at S1 in FIG. 7 that the oil temperature is below the first setting, the period of the pre-purging is calculated at S2 from the drop down of the oil temperature using the numerical expression. This is followed by S3 where the pre-purging is carried out for a calculated period. The combustion of the pulse burner 3 is then commenced at S4. Then, the action of stopping the combustion (S5 and S6) upon the temperature rising to the second setting level is conducted as equal to the control action of the previous description. When it is judged at S1 that the temperature of the oil drops down to the first setting level, the period of the pre-purging is calculated corresponding to the drop down of the oil temperature.

In this modification, even when the drop down of the oil temperature exceeds 10° C., the pre-purging is not systematically carried out for 80 seconds but its period changes linearly based on the degree, 60° C., of the temperature drop at which the leakage of the fuel gas is replaced by an exhaust of the combustion. Accordingly, the pre-purging is carried for adequate period not for an unnecessarily long period thus enabling the system to return to the continuous operation at optimum timing and enhance its utility.

The post-combustion time and the drop down of the oil temperature are not limited to the periods and the degrees specified in Embodiments 1 and 2 but may be modified arbitrarily. Also, the relationship between the post-combustion time and the period of the pre-purging or between the drop down of the oil temperature and the period of the pre-purging is not limited to such a linear change as described in the above embodiments but may be modified. For example, the period of the pre-purging may be changed in steps with the use of data where the periods are assigned to corresponding measurements of a desired range of the post-combustion time or the drop down of the oil temperature.

When Embodiment 1 employs a battery for counting the post-combustion time in case the power supply is disconnected by blackout, it can provide the same effect as of Embodiment 2.

As disclosed in claims 1 and 2 of the present invention, the period of the pre-purging is variable as determined depending on the elapsing time from the previous stop of the combustion or the drop down of the temperature of a cooking liquid, hence avoiding any delay in restarting the cooking caused by a longer period of the pre-purging after the filtering, allowing the system to return back to its continuous operation upon completion of a minimum period of the pre-purging, and improving the utility of the system. Also, as such a mechanism for temporarily stopping the combustion with a combustion interrupting switch is not needed, the system will be lowered in the overall production cost and its operability will be improved with no need of extra manipulation.

What is claimed is:

1. A liquid heating cooker comprising;
    a vessel where a cooking liquid is stored;
    means for heating the cooking liquid;
    means for measuring the temperature of the cooking liquid;
    means for controlling the combustion action and non-combustion action of the heating means in response to a measurement of the temperature of the cooking liquid measured by the temperature measuring means wherein the temperature of the cooking liquid is maintained at a predetermined level;
    a blower for supplying air to the heating means;
    a pre-purging means for actuating the blower prior to the combustion action of the heating means; and
    a counting means for counting a length of the non-combustion period of the heating means, wherein the controlling means presets a duration of the actuating action of the pre-purging means corresponding to the length of the non-combustion period and when the action of the pre-purging means is requested, determines the duration of the actuating action of the pre-purging means from a length of the preceding non-combustion period counted by the counting means, and actuates the blower for the determined duration.

2. A liquid heating cooker comprising:
    means for heating the cooking liquid;
    means for measuring the temperature of the cooking liquid;
    means for controlling the combustion action and non-combustion action of the heating means in response to a measurement of the temperature of the cooking liquid measured by the temperature measuring means wherein the temperature of the cooking liquid is maintained at a predetermined level;
    a blower for supplying air to the heating means;
    a pre-purging means for actuating the blower prior to the combustion action of the heating means, wherein the controlling means presets a duration of the actuating action of the pre-purging means corresponding to a declination in the temperature of the cooking liquid and when the action of the pre-purging means is requested, calculates the declination in the temperature of the cooking liquid during the non-combustion action of the heating means and determines the duration of the actuating action of the pre-purging means from the calculated declination in the temperature, and actuates the blower for the determined duration.

* * * * *